United States Patent
Cho et al.

(10) Patent No.: US 11,768,618 B2
(45) Date of Patent: *Sep. 26, 2023

(54) DISTRIBUTED PROCESSING DATA STORAGE DEVICE AND SYSTEM

(71) Applicant: SAMSUNG ELECTRONICS CO., LTD., Suwon-si (KR)

(72) Inventors: Young Jin Cho, Seoul (KR); Hyo Deok Shin, Seoul (KR); Kyung Bo Yang, Hwaseong-si (KR); Youn Ho Jeon, Gimhae-si (KR); Hyeok Jun Choe, Hwaseong-si (KR); Jung Hyun Hong, Hwaseong-si (KR); Soon Suk Hwang, Ansan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 78 days.

This patent is subject to a terminal disclaimer.

(21) Appl. No.: 17/468,107

(22) Filed: Sep. 7, 2021

(65) Prior Publication Data
US 2021/0405875 A1  Dec. 30, 2021

Related U.S. Application Data

(63) Continuation of application No. 16/560,417, filed on Sep. 4, 2019, now Pat. No. 11,137,921.

(30) Foreign Application Priority Data

Mar. 5, 2019 (KR) .......................... 10-2019-0025059

(51) Int. Cl.
*G06F 3/06* (2006.01)

(52) U.S. Cl.
CPC .............. *G06F 3/064* (2013.01); *G06F 3/061* (2013.01); *G06F 3/0608* (2013.01);
(Continued)

(58) Field of Classification Search
CPC ........ G06F 3/064; G06F 3/0608; G06F 3/061; G06F 3/0616; G06F 3/0644; G06F 3/0656; G06F 3/0679
See application file for complete search history.

(56) References Cited

U.S. PATENT DOCUMENTS 9,158,617 B2  10/2015  Cho et al.
9,336,135 B1   5/2016  Salessi et al.
(Continued)

FOREIGN PATENT DOCUMENTS

JP  2018-169773 A  11/2018

*Primary Examiner* — Ryan Bertram
(74) *Attorney, Agent, or Firm* — Sughrue Mion, PLLC

(57) ABSTRACT

A data storage device is provided. The data storage device includes: a first function block of a device controller configured to receive user data and perform a first data processing; a first buffer memory connected to the first function block and configured to store user data subjected to the first data processing as first process data; a second function block of the device controller configured to receive a data write command determined based on the first process data; and a non-volatile memory connected to the second function block, and configured to receive and store data stored in the first buffer memory. The user data is provided to the first function block before the data write command is provided to the second function block.

20 Claims, 15 Drawing Sheets

(52) U.S. Cl.
CPC .......... *G06F 3/0616* (2013.01); *G06F 3/0644* (2013.01); *G06F 3/0656* (2013.01); *G06F 3/0679* (2013.01)

(56) References Cited

U.S. PATENT DOCUMENTS

| | | | |
|---|---|---|---|
| 9,336,313 B1* | 5/2016 | Salessi | G06F 3/061 |
| 10,360,144 B2 | 7/2019 | Oshimi et al. | |
| 2005/0249008 A1 | 11/2005 | Hsieh | |
| 2012/0072641 A1 | 3/2012 | Suzuki et al. | |
| 2013/0297894 A1 | 11/2013 | Cohen et al. | |
| 2014/0040639 A1 | 2/2014 | Raam | |
| 2014/0208062 A1 | 7/2014 | Cohen | |
| 2014/0281167 A1 | 9/2014 | Danilak et al. | |
| 2014/0365692 A1 | 12/2014 | Smith et al. | |
| 2015/0127883 A1 | 5/2015 | Chen et al. | |
| 2015/0286581 A1 | 10/2015 | Lee et al. | |
| 2016/0162375 A1 | 6/2016 | Kim | |
| 2016/0233880 A1 | 8/2016 | Mizushima et al. | |
| 2016/0378352 A1 | 12/2016 | Khan et al. | |
| 2017/0017395 A1 | 1/2017 | Kurokawa et al. | |
| 2017/0068458 A1 | 3/2017 | Shin et al. | |
| 2017/0286220 A1 | 10/2017 | Gerhard et al. | |
| 2017/0344304 A1 | 11/2017 | Alves | |
| 2017/0371593 A1 | 12/2017 | Li et al. | |
| 2018/0088811 A1* | 3/2018 | Kanno | G06F 3/0604 |
| 2018/0088812 A1 | 3/2018 | Lee | |
| 2018/0101330 A1 | 4/2018 | Yoon et al. | |
| 2018/0217777 A1 | 8/2018 | Jiang et al. | |
| 2018/0246664 A1 | 8/2018 | Wu et al. | |
| 2018/0349266 A1 | 12/2018 | Canepa et al. | |
| 2019/0205035 A1 | 7/2019 | Mizushima et al. | |
| 2019/0362081 A1 | 11/2019 | Kanno | |
| 2020/0050401 A1* | 2/2020 | Gibb | G06F 3/0656 |
| 2020/0081780 A1 | 3/2020 | Li | |
| 2020/0089784 A1 | 3/2020 | Li | |
| 2020/0183583 A1* | 6/2020 | Kachare | G06F 3/061 |
| 2020/0304142 A1* | 9/2020 | Nakanishi | H03M 7/3059 |

* cited by examiner

DISTRIBUTED PROCESSING DATA STORAGE DEVICE AND SYSTEM

CROSS-REFERENCE TO RELATED APPLICATIONS

This application is a Continuation Application of U.S. application Ser. No. 16/560,417, filed Sep. 4, 2019, which claims priority from Korean Patent Application No. 10-2019-0025059, filed on Mar. 5, 2019 in the Korean Intellectual Property Office, the disclosures of which are incorporated herein by reference in their entireties.

BACKGROUND

1. Field

Example embodiments of the present disclosure relate to data storage device and system. More specifically, example embodiments relate to a data storage device and system that increase an effect of data processing and reduce overhead of a processor.

2. Related Art

As technology continues to develop, the amount of data to be managed and stored continues to increase. Further, it is difficult to store a huge amount of data as raw data.

Thus, there is a need for an effective and economic data storage method performed by processing raw data. However, development of the data processing is also complicated and diversified with the development of technology. Performing complex data processing requires many operations, and when a single processor performs many operations, overhead occurs in the processor and latency increases.

Therefore, there is a need for a method or system for efficiently managing data by executing complex data processing, while maintaining the overhead of the processor at a proper level.

SUMMARY

One or more example embodiments provide data processing device and system that perform the effective data processing.

One or more example embodiments also provide data processing device and system that perform the data processing with reduced latency.

According to an aspect of an example embodiment, there is provided a data storage device including: a device controller configured to implement a first function block and a second function block configured to perform functions independent of the first function block; a first buffer memory connected to the first function block; a second buffer memory connected to the second function block and configured to interface with another device that is external to the data storage device; and a non-volatile memory connected to the first function block. The first function block and the second function block are connected to each other and configured to directly exchange data, and the first function block is configured to receive first process data from the second function block in accordance with a data write command and write the first process data to the non-volatile memory.

According to an aspect of an example embodiment, there is provided a data storage device including: a first function block of a device controller configured to receive user data and perform a first data processing to generate first process data; a first buffer memory connected to the first function block and configured to store the first process data; a second function block of the device controller configured to receive a data write command determined based on the first process data; and a non-volatile memory connected to the second function block and configured to receive and store data stored in the first buffer memory. The user data corresponding to the first process data is provided to the first function block before the data write command corresponding to the first process data is provided to the second function block.

According to an aspect of an example embodiment, there is provided a data storage system including: a host processor configured to generate a data write command and a data read command; and a data storage device including a device controller configured to communicate with the host processor. The device controller is configured to receive user data before receiving the data write command from the host processor, the device controller is configured to provide first process data to the host processor based on the data read command, and the first process data is data generated by the device controller and the host processor based on the user data.

Aspects are not restricted to those set forth herein. The above and other aspects will become more apparent to one of ordinary skill in the art by referencing the detailed description given below.

DETAILED DESCRIPTION

Figure 1:
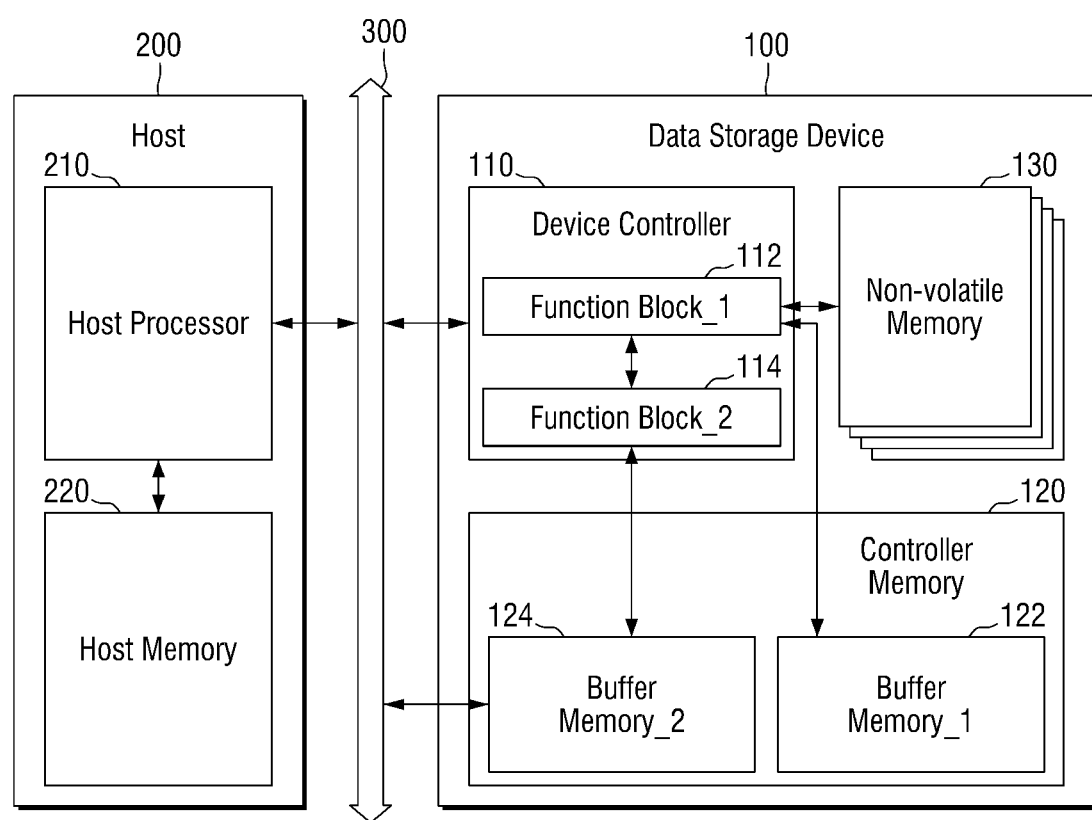
FIG. 1 is diagram illustrating a data storage system according to one or more example embodiments.

FIG. 1 is a diagram illustrating a data storage system according to one or more example embodiments.

Referring to FIG. 1, a data storage system according to one or more example embodiments includes a data storage device 100, a host 200 and a system bus 300. For example, the data storage system may be implemented in a personal computer (PC), a workstation, a data center, an internet data center (IDC), a storage area network (SAN), a network attached storage (NAS) or a mobile computing device. However, example embodiments are not limited thereto.

For example, a mobile computing device may be implemented as a laptop computer, a mobile phone, a smart phone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), a wearable computer, an internet of things (IoT) device, an internet of everything (IoE) device, a drone, a RFID device, or an e-book. However, example embodiments are not limited thereto.

The host 200 may be connected to the data storage device 100 via a system bus 300. The system bus 300 may be, for example, a Universal Flash Storage (UFS), a Small Computer System Interface (SCSI), a Serial Attached SCSI (SAS), a Serial Advanced Technology Attachment (SATA), a Peripheral Component Interconnect Express (PCIe), an embedded MultiMediaCard (eMMC), a Fibre Channel (FC), an Advanced Technology Attachment (ATA), an Integrated Drive Electronics (IDE), a Universal Serial Bus (USB), IEEE 1394 Firewire, or the like. However, example embodiments are not limited thereto, and the system bus 300 may be an interface that allows data to be transmitted and received between the host 200 and the data storage device 100.

Hereinafter, for convenience of explanation, the system bus 300 will be described as a PCIe. However, example embodiments are not limited thereto, and any data storage system which uses any interface, including the electrical interfaces mentioned above, may be used.

According to one or more example embodiments, the data storage device 100 may include a device controller 110, a controller memory 120, and a non-volatile memory 130. The device controller 110 may execute program code for controlling the data storage device 100. For example, the device controller 110 may execute a program code for performing a data write operation and a data read operation in response to a request from the host 200. In another example, the device controller 110 may execute a program code for performing a background operation, such as a garbage collection operation on the non-volatile memory 130. In another example, the device controller 110 may perform the data processing on data to be written to the non-volatile memory 130 or data to be read from the non-volatile memory 130.

The device controller 110 may include a central processing unit (CPU), a graphic processing unit (GPU), an application processor (AP), a micro processing unit (MPU), or the like, but example embodiments are not limited thereto.

The device controller 110 may include a first function block 112 and a second function block 114. The first function block 112 and the second function block 114 may mean function blocks that perform functions independent of each other. The first function block 112 and the second function block 114 may be implemented as hardware, firmware, software or a combination thereof, respectively. The first function block 112 and the second function block 114 may be interconnected to exchange data directly without using a bus (e.g., a system bus 300). For example, the device controller 110 is connected to an end point (EP) of PCIe, and the first function block 112 and the second function block 114 may be interconnected via a PCIe bridge. However, example embodiments are not limited thereto.

The controller memory 120 may be a memory that temporarily stores data. The controller memory 120 may include a first buffer memory 122 and a second buffer memory 124. Although FIG. 1 illustrates that both the first buffer memory 122 and the second buffer memory 124 are included in the controller memory 120, this is for the convenience of the description, and example embodiments are not limited thereto. For example, the first buffer memory 122 and the second buffer memory 124 may be implemented as different regions of the same memory device, or may be implemented as physically different memory devices. Also, although FIG. 1 illustrates that the controller memory 120 is a separate constituent element distinct from the device controller 110, example embodiments are not limited thereto. For example, the controller memory 120 may be included in the device controller 110.

Access to the first buffer memory 122 from the outside of the data storage device 100, that is, the host 200 is not permitted. On the other hand, access to the second buffer memory 124 from the host 200 is permitted. In other words, the second buffer memory 124 is exposed to the outside of the data storage device 100, but the first buffer memory 122 is not exposed to the outside of the data storage device 100. Although FIG. 1 illustrates that the second buffer memory 124 is exposed to the host 200 via the system bus 300, this is only for the convenience of explanation, and example embodiments are not limited thereto. For example, the host 200 and the second buffer memory 124 may be directly connected, and the second buffer memory 124 may interface with the host 200. Additional description in this regard will be provided later with reference to FIGS. 3 and 4.

The controller memory 120, that is, the first buffer memory 122 and the second buffer memory 124 may be implemented as a static random access memory (SRAM), a fast static RAM (Fast-SRAM), and/or a dynamic RAM (DRAM). However, example embodiments are not limited thereto.

The non-volatile memory 130 is a memory in which data is stored semi-permanently. The non-volatile memory 130 may include at least one of a flash memory, a resistive RAM (RRAM), a phase change memory (PRAM), a magnetoresistive memory (MRAM), a ferroelectric memory (FRAM), and a spin injection magnetization reversal memory (Spin STT-RAM), but example embodiments are not limited thereto.

Figure 2:
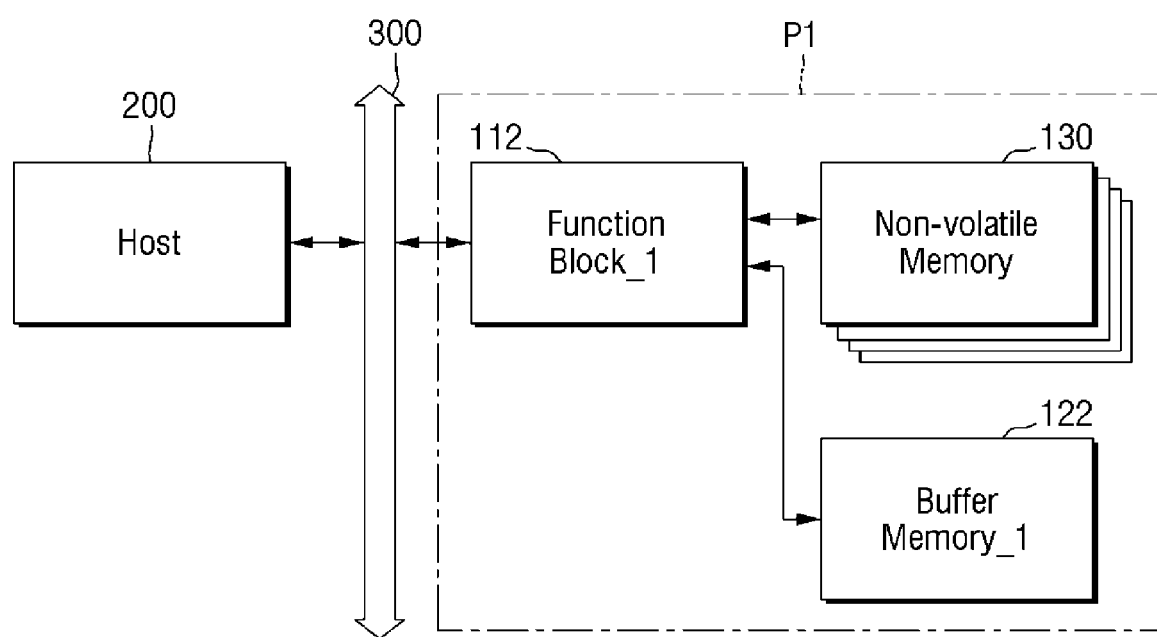
FIG. 2 is a diagram illustrating a first data path according to one or more example embodiments.

According to one or more example embodiments, the first function block 112, the first buffer memory 122 and the non-volatile memory 130 may form a first data path (P1 of FIG. 2). Reference is made to FIG. 2 for an exemplary illustration.

FIG. 2 is a diagram illustrating a first data path according to one or more example embodiments.

Referring to FIG. 2, the first function block 112 may be connected to the first buffer memory 122. Also, the first function block 112 may be connected to the non-volatile memory 130.

In other words, the first function block 112, the first buffer memory 122 and the non-volatile memory 130 may form a first data path P1 to which data is transmitted. For example, the first data path P1 may be implemented as a non-volatile memory express (NVMe) interface.

According to one or more example embodiments, the first function block 112 may be configured to drive firmware or software for controlling the non-volatile memory 130. For example, the first function block 112 may provide a chip enable signal, a write enable signal, a read enable signal, and the like to the non-volatile memory 130. The first function block 112 may control input/output of data to and from the first buffer memory 122 and the non-volatile memory 130. For example, when the garbage collection operation on the non-volatile memory 130 is performed, the first function block 112 reads data from the non-volatile memory 130 and outputs the data in the first buffer memory 122. The first function block 112 may apply an erase voltage to a specific memory block of the non-volatile memory 130 or may write the data stored in the first buffer memory 122 on the non-volatile memory 130 again. In another example, in response to a data read request from the host 200, the first function block 112 may temporarily store the data read from the non-volatile memory 130 in the first buffer memory 122, and may provide the data to the host 200.

According to one or more example embodiments, the first buffer memory 122 may store data for which security is required (e.g., an encryption code, mapping data or the like). In this regard, the first buffer memory 122 is configured so as not to be exposed to the outside of the data storage device 100. As described above, the host 200 may not access the first buffer memory 122, and may not directly read or change the data stored in the first buffer memory 122.

Figure 3:
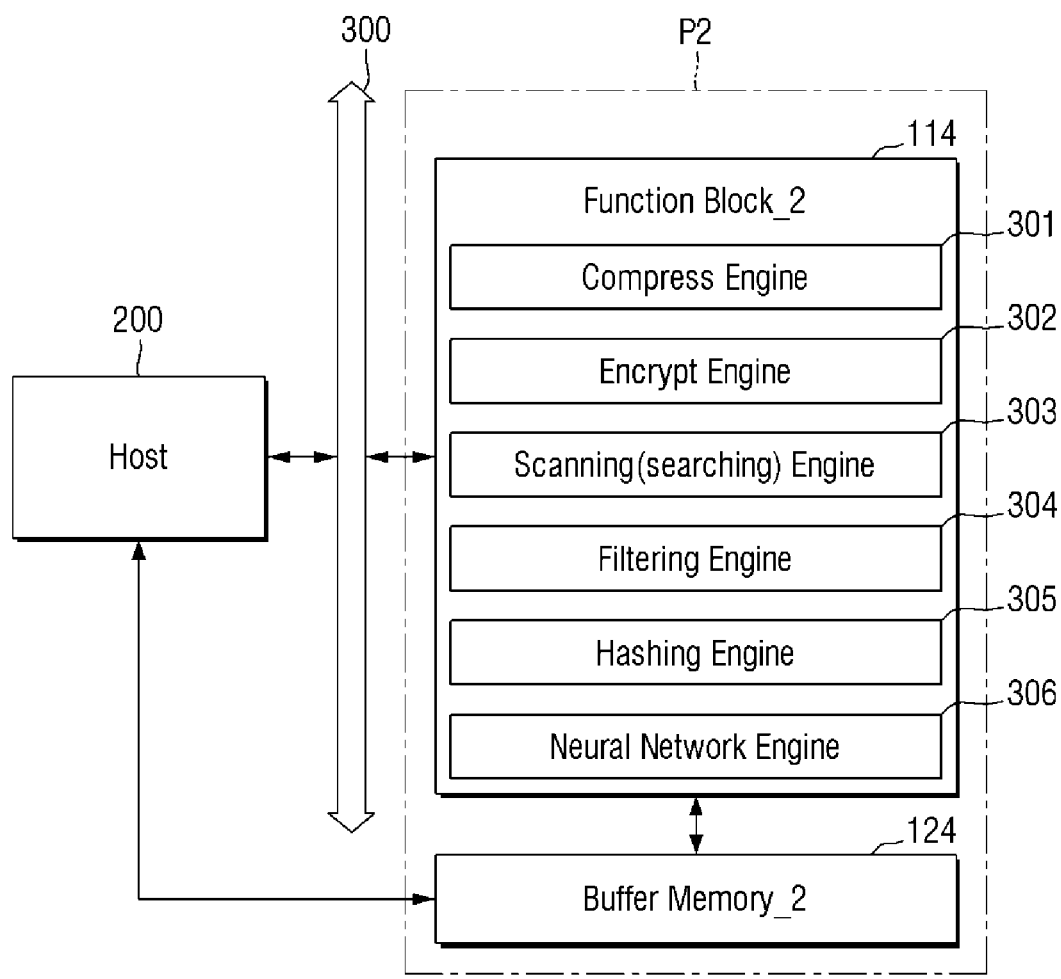
FIGS. 3 and 4 are diagrams illustrating a second data path according to one or more example embodiments.
Figure 4:
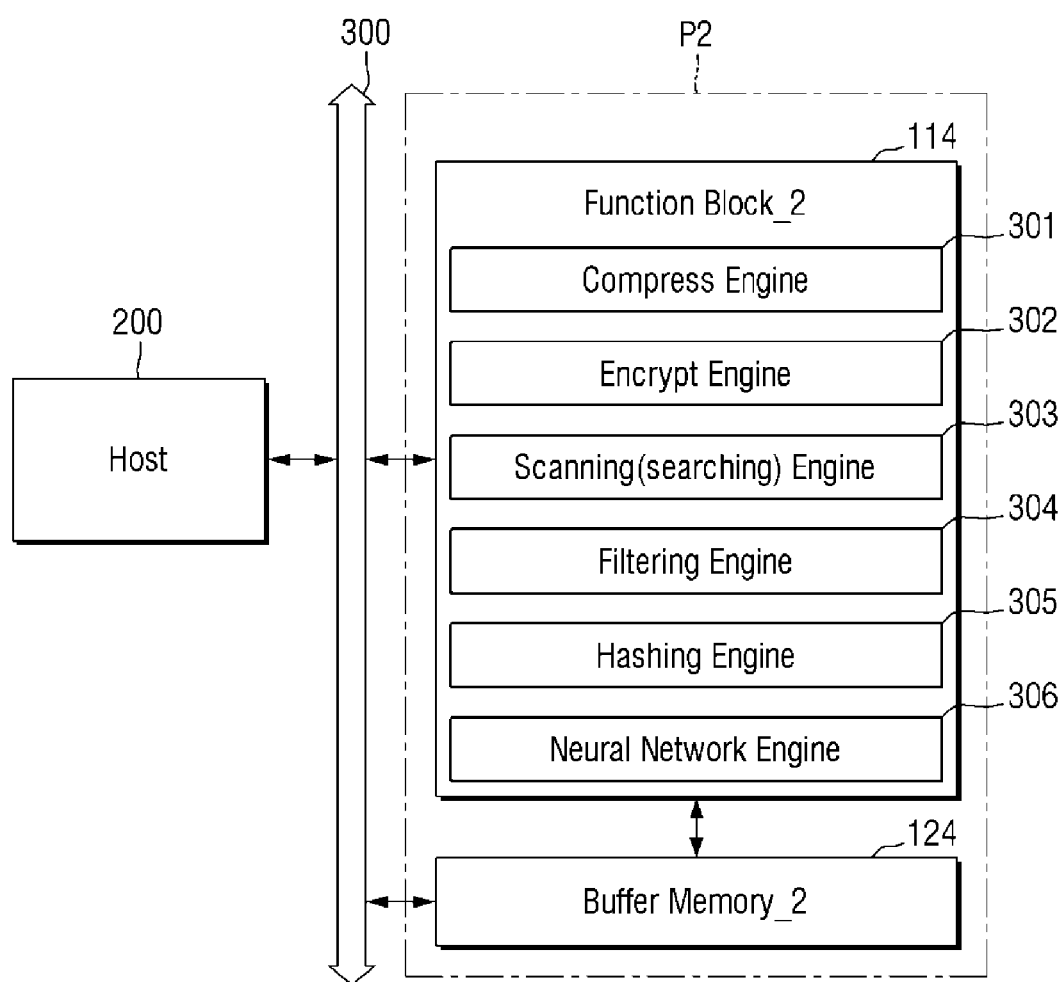

Referring again to FIG. 1, the second function block 114 and the second buffer memory 124 may form a second data path (P2 of FIGS. 3 and 4). Reference is made to FIGS. 3 and 4 for an exemplary illustration.

FIGS. 3 and 4 are exemplary diagrams for illustrating the second data path according to one or more example embodiments.

Referring to FIG. 3, the second function block 114 may be connected to the second buffer memory 124. In other words, the second function block 114 and the second buffer memory 124 may be connected to each other to form a second data path P2.

According to one or more example embodiments, the second function block 114 may perform first data processing on the received data. The second function block 114 may include at least one of a data compression engine 301, a data encryption engine 302, a data scanning engine 303, a data filtering engine 304, a data hashing engine 305 and a neural network engine 306. The second function block 114 may perform the first data processing using one or more of the data compression engine 301, the data encryption engine 302, the data scanning engine 303, the data filtering engine 304, the data hashing engine 305 and the neural network engine 306. For example, the first data processing may include at least one function of data compression or decompression, data encryption or decryption, data scanning, data filtering, and data hashing. Further, the first data processing may include performing deep learning training.

According to one or more example embodiments, data subjected to the first data processing by the second function block 114 may be provided to the second buffer memory 124. In other words, the second buffer memory 124 may store the result data of the first data processing. Furthermore, the second buffer memory 124 may also store intermediate data of the first data processing. For example, the second function block 114 may compress the received data, using the data compression engine 301. At this time, the compressed data or the intermediate data may be stored in the second buffer memory 124.

As mentioned above, the second buffer memory 124 may permit access from the outside of the data storage device 100, i.e., the host 200. According to one or more example embodiments, as illustrated in FIG. 3, the host 200 may access the second buffer memory 124 through the direct memory access (DMA). According to one or more example embodiments, as illustrated in FIG. 4, the host 200 may access the second buffer memory 124 through the system bus 300. According to one or more example embodiments, the host 200 may access the second buffer memory 124 to perform the second data processing on data stored in the second buffer memory 124. Specific examples will be described later.

Referring again to FIG. 1, the host 200 may include a host processor 210 and a host memory 220. A host processor 210 may be connected to the host memory 220. The host processor 210 may include a CPU, a GPU, an AP, an MPU, or the like, but example embodiments are not limited thereto. Also, the host memory 220 may be implemented as a static RAM (SRAM), a fast static RAM (Fast-SRAM), and/or a dynamic RAM (DRAM), but example embodiments are not limited thereto.

The host processor 210 may control the data storage device 100. For example, the host processor 210 may generate a data write command, and provide it to the first function block 112. In another example, the host processor 210 may provide data stored in host memory 220 to the second function block 114. Also, the host processor 210 may access the second buffer memory 124 of the data storage device 100 to perform the data processing (e.g., the second data processing) on the data stored in the second buffer memory 124. The functions performed by the host processor 210 may be implemented via hardware, firmware, software or a combination thereof, respectively.

Referring to FIGS. 1 to 4, the first data path P1 and the second data path P2 are independent from each other from the viewpoint of the host 200. However, because the first function block 112 and the second function block 114 are connected to each other, a direct data exchange between the first data path P1 and the second data path P2 is enabled. In other words, the first data path P1 and the second data path P2 may exchange data with each other without using the system bus 300. In other words, data may be exchanged between the first data path P1 and the second data path P2 without using the system bus 300, and the latency of data transmission/reception may be reduced. A data write operation using the first data path P1 and the second data path P2 will be described with reference to FIGS. 5 to 8.

Figure 5:
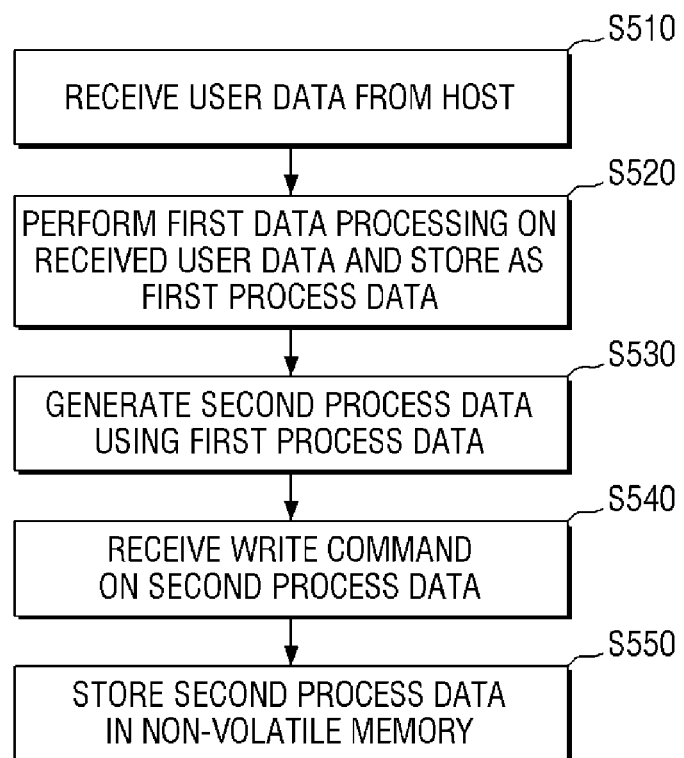
FIG. 5 is a flow chart illustrating a data write operation of a data storage system according to one or more example embodiments.
Figure 6:
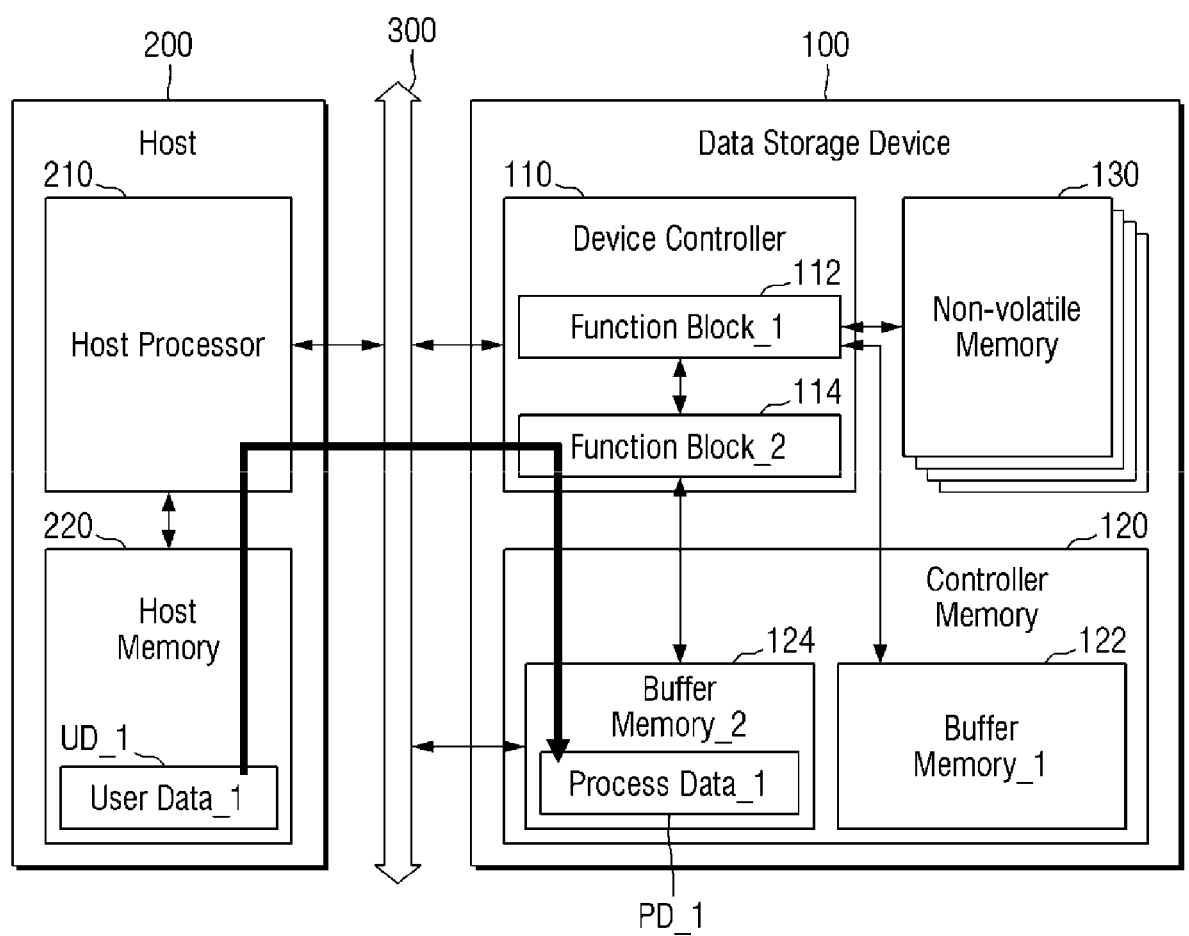
FIGS. 6, 7 and 8 are diagrams illustrating a data write operation of a data storage system according to one or more example embodiments.
Figure 7:
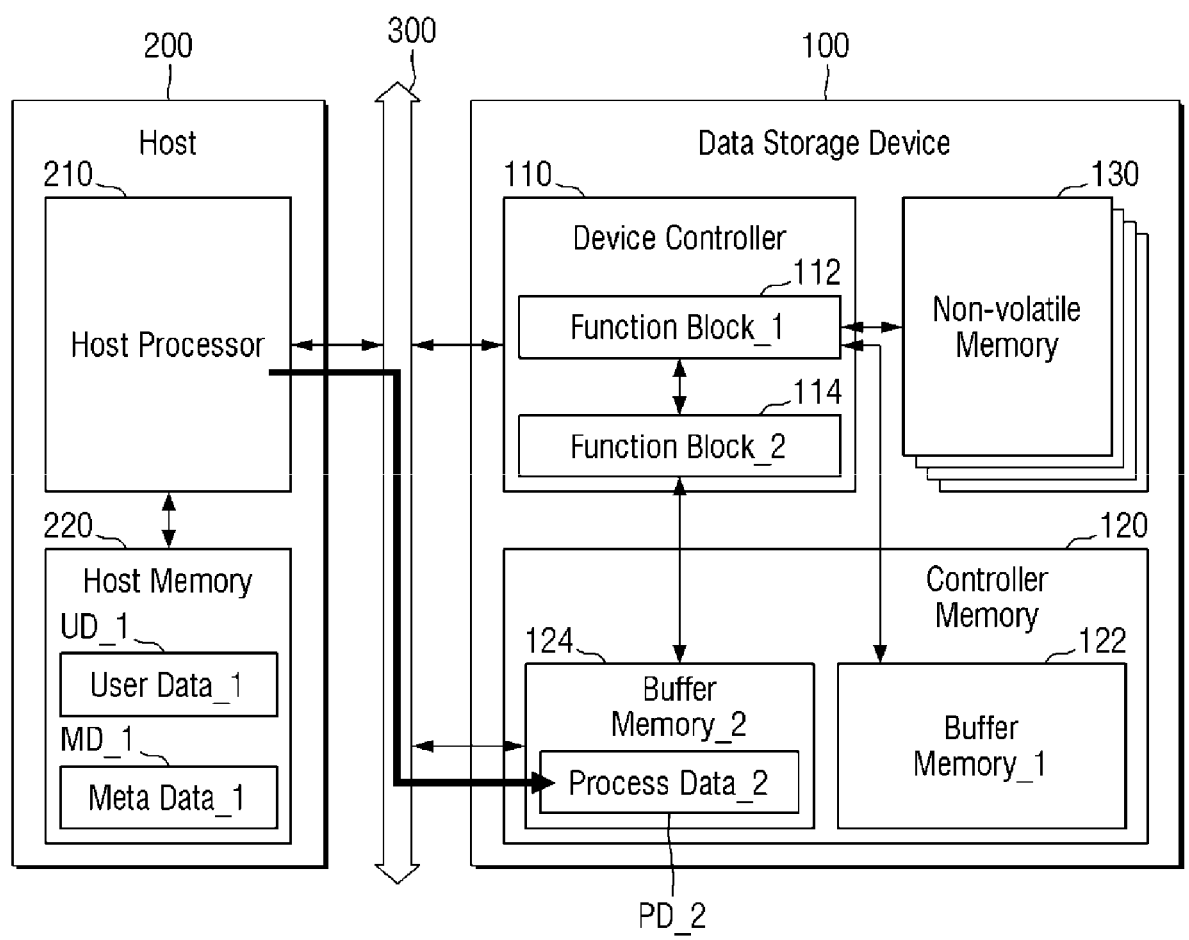
Figure 8:
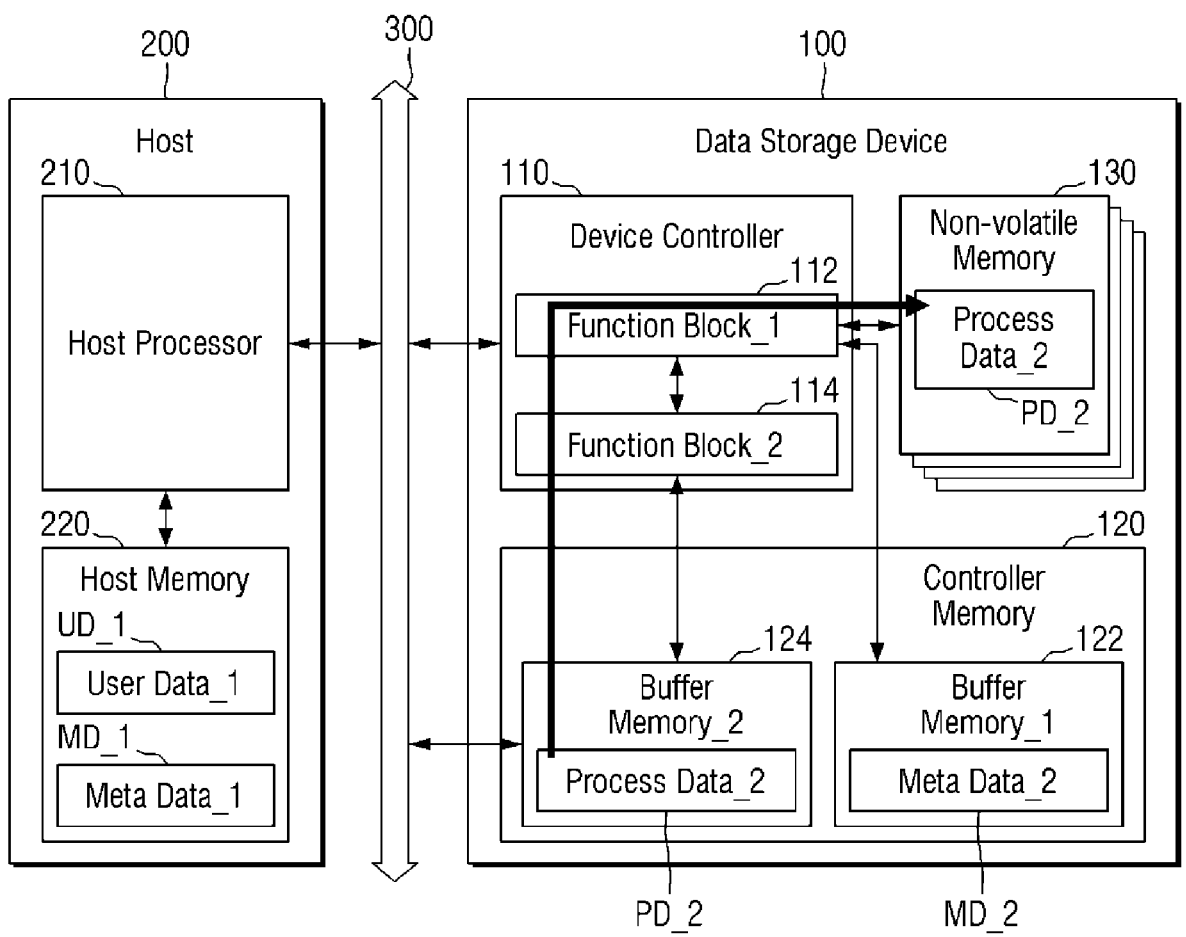

FIG. 5 is an exemplary flow chart illustrating a data write operation of a data storage system according to one or more example embodiments. FIGS. 6 to 8 are exemplary diagrams illustrating a data write operation of a data storage system according to one or more example embodiments.

Referring to FIGS. 1, 5 and 6, before the host processor 210 generates a data write command (or request), the host processor 210 may provide first user data UD_1 to the data storage device 100. The data storage device 100, for example, the second function block 114 may receive the first user data UD_1 from the host 200 (S510). The second function block 114 may perform the first data processing on the received first user data UD_1. As described above, the second function block 114 may use at least one of the data compression engine 301, the data encryption engine 302, the data scanning engine 303, the data filtering engine 304, the data hashing engine 305 and the neural network engine 306 included in the second function block 114 so as to execute the first data processing. For example, the second function block 114 may perform data compression processing on the received first user data UD_1 using the data compression engine 301.

For convenience of description, first user data UD_1 subjected to the first data processing by the second function block 114 is defined as first process data PD_1. For example, the first process data PD_1 may mean the first user data UD_1 subjected to the data compression processing. In other words, the second function block 114 may generate the first process data PD_1, using the first user data UD_1. The generated first process data PD_1 may be stored in the second buffer memory 124 (S520).

Although FIG. 6 illustrates that the first user data UD_1 received from the host 200 is directly provided to the second function block 114 to generate the first process data PD_1, example embodiments are not limited thereto. For example, the first user data UD_1 received from the host 200 may be temporarily stored in the second buffer memory 124, and the second function block 114 may read the first user data UD_1 from the second buffer memory 124 to generate the first process data PD_1. Those skilled in the art would appreciate that various data storage systems may be implemented by modifying or adopting example embodiments described herein.

Referring to FIGS. 1, 5 and 7, the host processor 210 may access the second buffer memory 124. The host processor 210 may execute the second data processing on the first process data PD_1 stored in the second buffer memory 124. The second data processing may be data processing at a stage after the first data processing. For example, if the first data processing is data compression processing, the second data processing may be packing processing on the compressed data. For example, the data (i.e., the first process data PD_1) compressed and fragmented by the first data processing are packed by the second data processing and may be changed to data pages having successively valid values. For convenience of explanation, the first process data PD_1 subjected to the second data processing by the host processor 210 is defined as second process data PD_2. In other words, the host processor 210 may generate the second process data PD_2, using the first process data PD_1 stored in the second buffer memory 124 (S530).

According to one or more example embodiments, when the host processor 210 generates the second process data PD_2, first metadata MD_1 may be stored in the host memory 220. The first metadata MD_1 may be, for example, size information and offset information on the first process data PD_1. The first metadata MD_1 may be used when performing third data processing. Specific contents thereof will be described later.

Although FIG. 7 describes that the first metadata MD_1 is stored in the host memory 220 separately from the second process data PD_2, example embodiments are not limited thereto. According to one or more example embodiments, the first metadata MD_1 may also be stored in the second buffer memory 124 rather than the host memory 220. According to one or more example embodiments, the second process data PD_2 may include the first metadata MD_1. For example, when the host processor 210 generates the second process data PD_2 using the first process data PD_1, the size information or the like on the first process data PD_1 may be included in the second process data PD_2 (see FIG. 11). Those skilled in the art would appreciate that the first metadata MD_1 may be managed in various ways.

According to one or more example embodiments, when the second process data PD_2 is generated by the host processor 210, the host processor 210 may generate the write data command, using the second process data PD_2. The host processor 210 may provide the generated data write command to the device controller 110. In other words, the data storage device 100 may receive the first user data UD_1 before receiving the data write command from the host 200.

Referring to FIGS. 1 to 5 and 8, the device controller 110 may receive the data write command on the second process data PD_2 (S540). When the device controller 110 receives the data write command on the second process data PD_2, the device controller 110 reads the second process data PD_2 via the second data path P2, and may store the second process data PD_2 in the non-volatile memory 130 through the first data path P1 (S550). In other words, when the device controller 110 receives the data write command on the second process data, the device controller 110 may read the second process data PD_2 stored in the second buffer memory 124, using the second function block 114. Subsequently, the second process data PD_2 may be provided directly to the first function block 112 from the second function block 114 without passing through the system bus 300. The first function block 112 may receive the second process data PD_2 from the second function block 114. The first function block 112 may provide and store the received second process data PD_2 to the non-volatile memory 130. At this time, address information (or mapping information) on the position or the like of the non-volatile memory 130, at which the second process data PD_2 is stored, may be stored as the second metadata MD_2 in the first buffer memory 122.

According to one or more example embodiments, the first data processing may be performed by the device controller 110, and the second data processing may be performed by the host processor 210. That is, the data processing on data to be written to the data storage device 100 may be distributed to the device controller 110 and the host processor 210, thereby reducing the operation overhead of the device controller 110 and the host processor 210.

Also, the device controller 110 may have relatively lower performance as compared to the host processor 210. Therefore, relatively complex data processing may not be enabled when using only the device controller 110. However, according to one or more example embodiments, by implementing the processing such as a simple operation in the device controller 110, and by implementing the processing such as a complex operation or a metadata management in the host processor 210, more complex and effective data processing is enabled. In addition, as described above, because the first function block 112 and the second function block 114 are connected to each other to enable direct data exchange, the latency associated with data exchange may also be effectively reduced.

Figure 9:
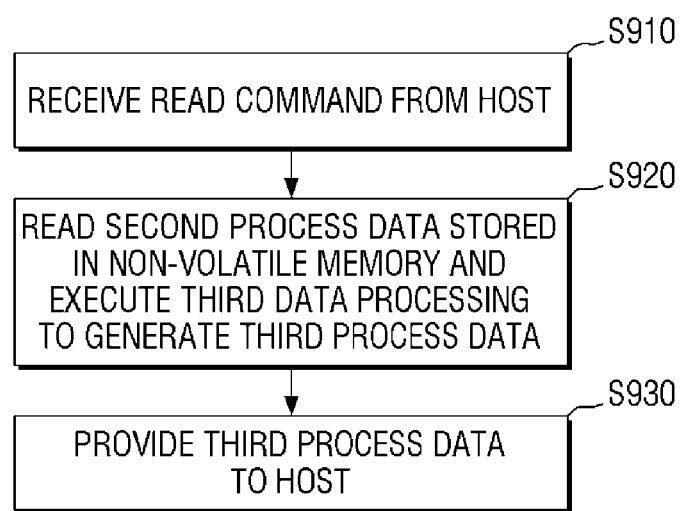
FIG. 9 is a flow chart illustrating a data read operation of a data storage system according to one or more example embodiments.
Figure 10:
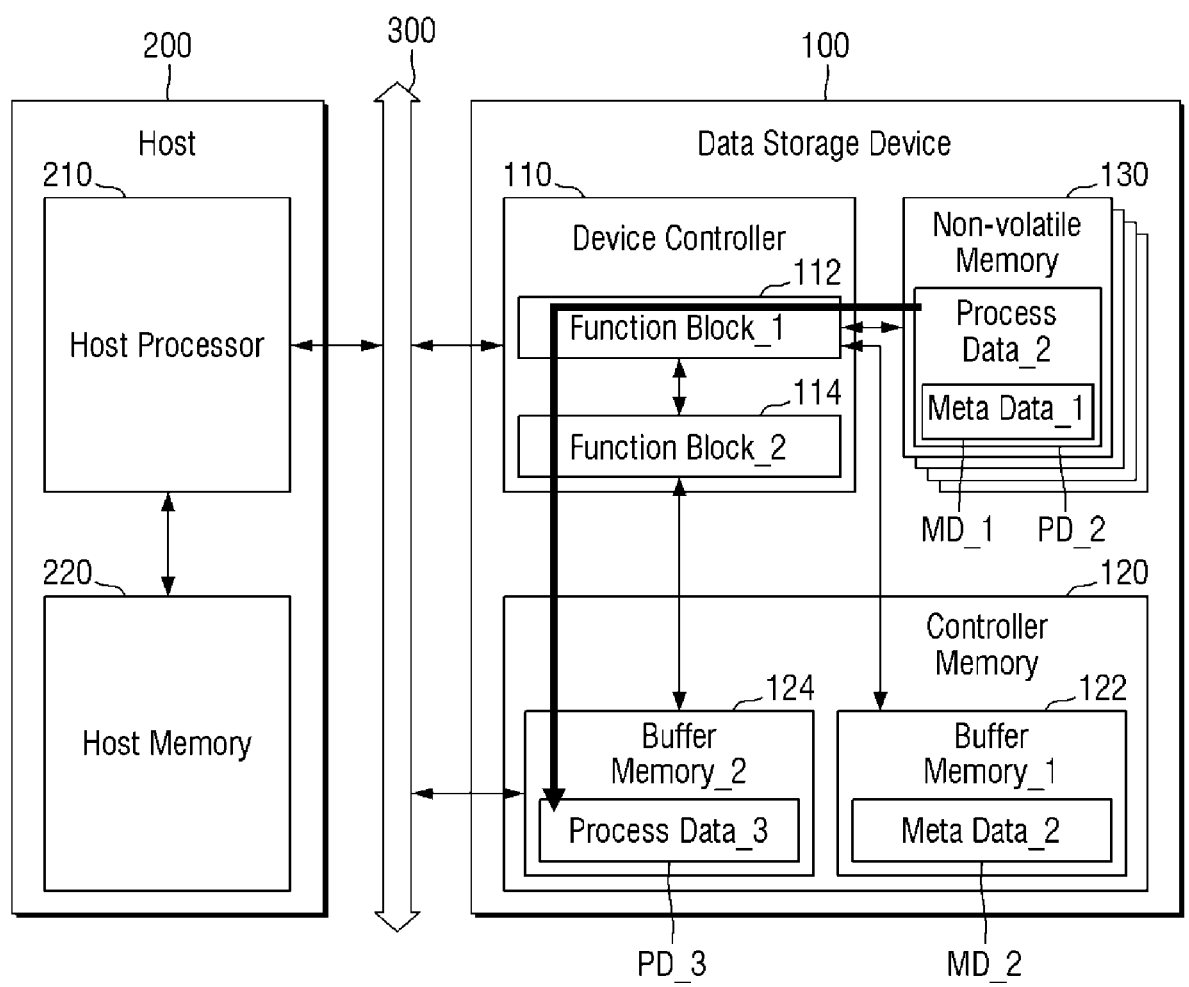
FIGS. 10 and 11 are diagrams illustrating the data read operation of a data storage system according to one or more example embodiments.
Figure 11:
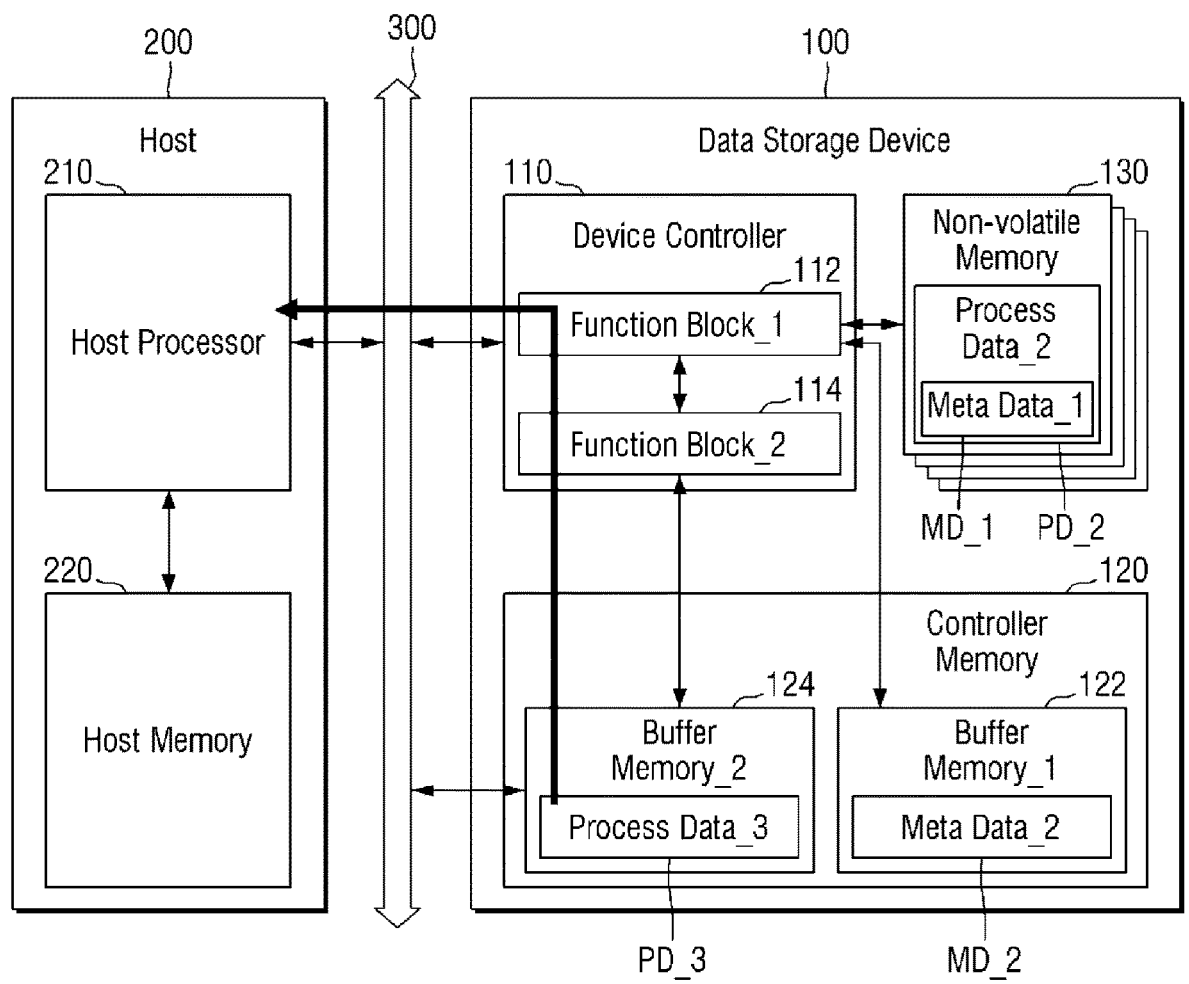

FIG. 9 is an exemplary flow chart illustrating the data read operation of the data storage system according to one or more example embodiments. FIGS. 10 and 11 are exemplary diagrams illustrating the data read operation of the data storage system according to one or more example embodiments.

Referring to FIGS. 1, 9 and 10, the host processor 210 may provide a data read command related to the second process data PD_2 to the device controller 110. The device controller 110 may receive a data read command related to the second process data PD_2 (S910).

The second process data PD_2 stored in the non-volatile memory 130 is read through the first data path P1, and may be stored in the second buffer memory 124 via the second data path P2. In other words, the first function block 112 having received the data read command may read the second process data PD_2 from the non-volatile memory 130 by referring to the second metadata MD_2 of the first buffer memory 122. At this time, the second process data PD_2 may include the first metadata MD_1. The first function block 112 may directly provide the read second process data PD_2 to the second function block 114. The second function block 114 may execute the third data processing on the provided second process data PD_2. For convenience of description, the second process data PD_2 subjected to the third data processing by the second function block 114 is defined as a third process data PD_3. In other words, the second function block 114 may generate the third process data PD_3, using the second process data PD_2 (S920). According to one or more example embodiments, the second function block 114 may refer to the first metadata MD_1 included in the second process data PD_2 to generate the third process data PD_3. The third data PD_3 may be stored in the second buffer memory 124. Assuming that the second process data PD_2 is compressed data, the third process data PD_3 may be, for example, decompressed data.

Referring to FIGS. 1, 9 and 11, the third process data PD_3 may be provided to the first function block 112 from the second function block 114. In response to the data read command from the host 200, the first function block 112 may provide the provided third process data PD_3 to the host 200 (S930).

Figure 12:
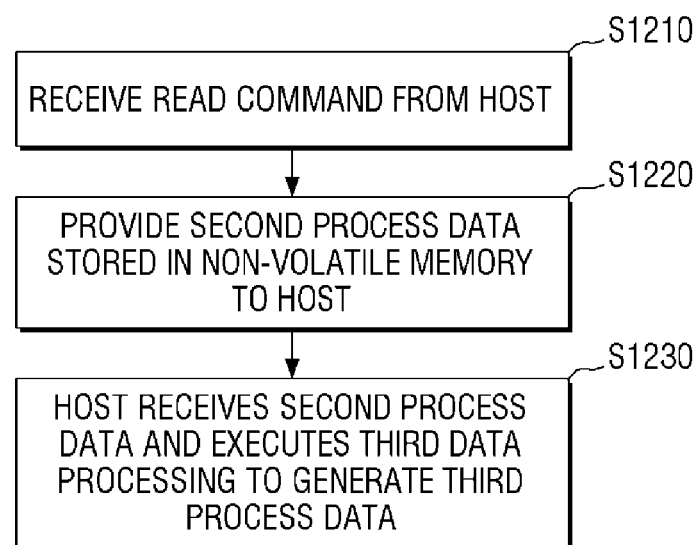
FIG. 12 is a flow chart illustrating a data read operation of a data storage system according to one or more example embodiments.
Figure 13:
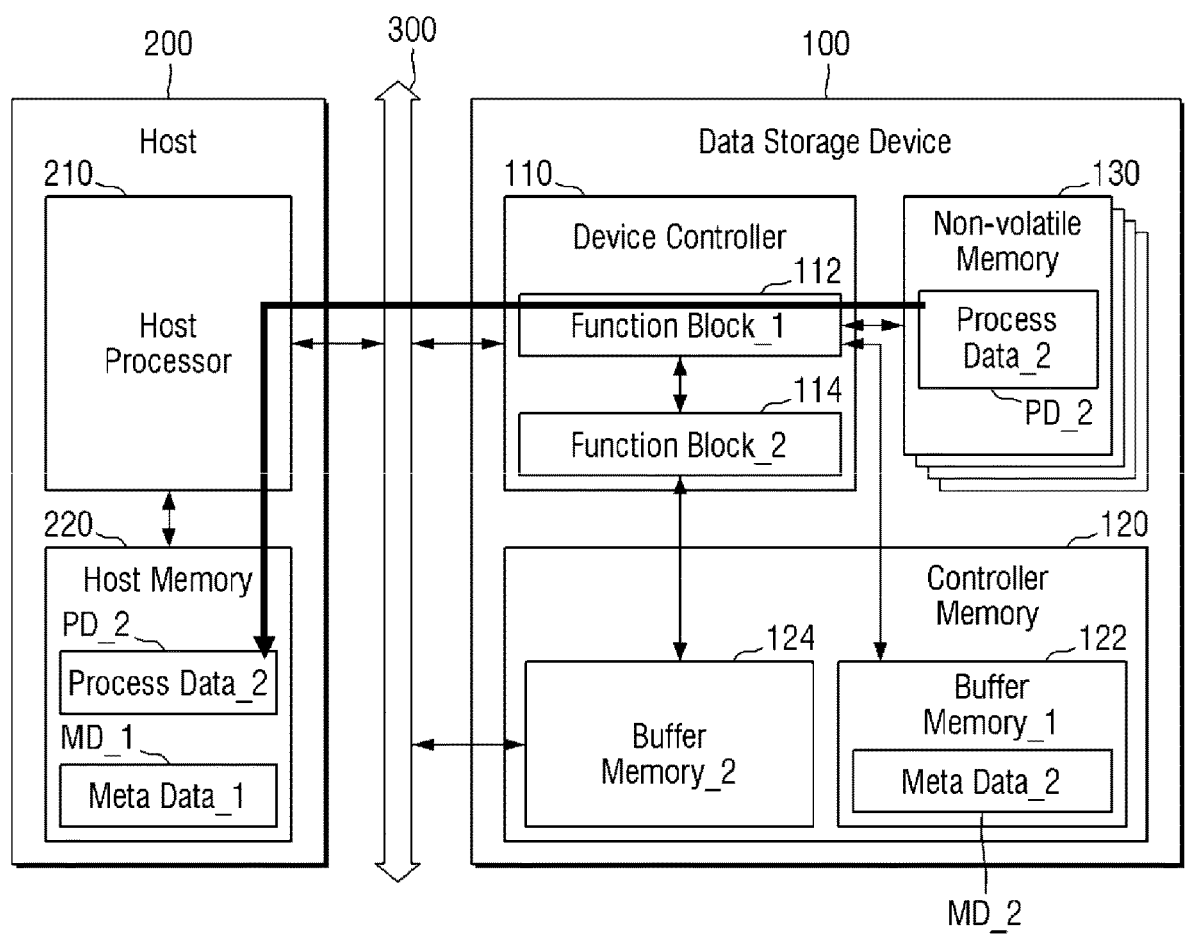
FIGS. 13 and 14 are diagrams illustrating a data read operation of a data storage system according to one or more example embodiments.
Figure 14:
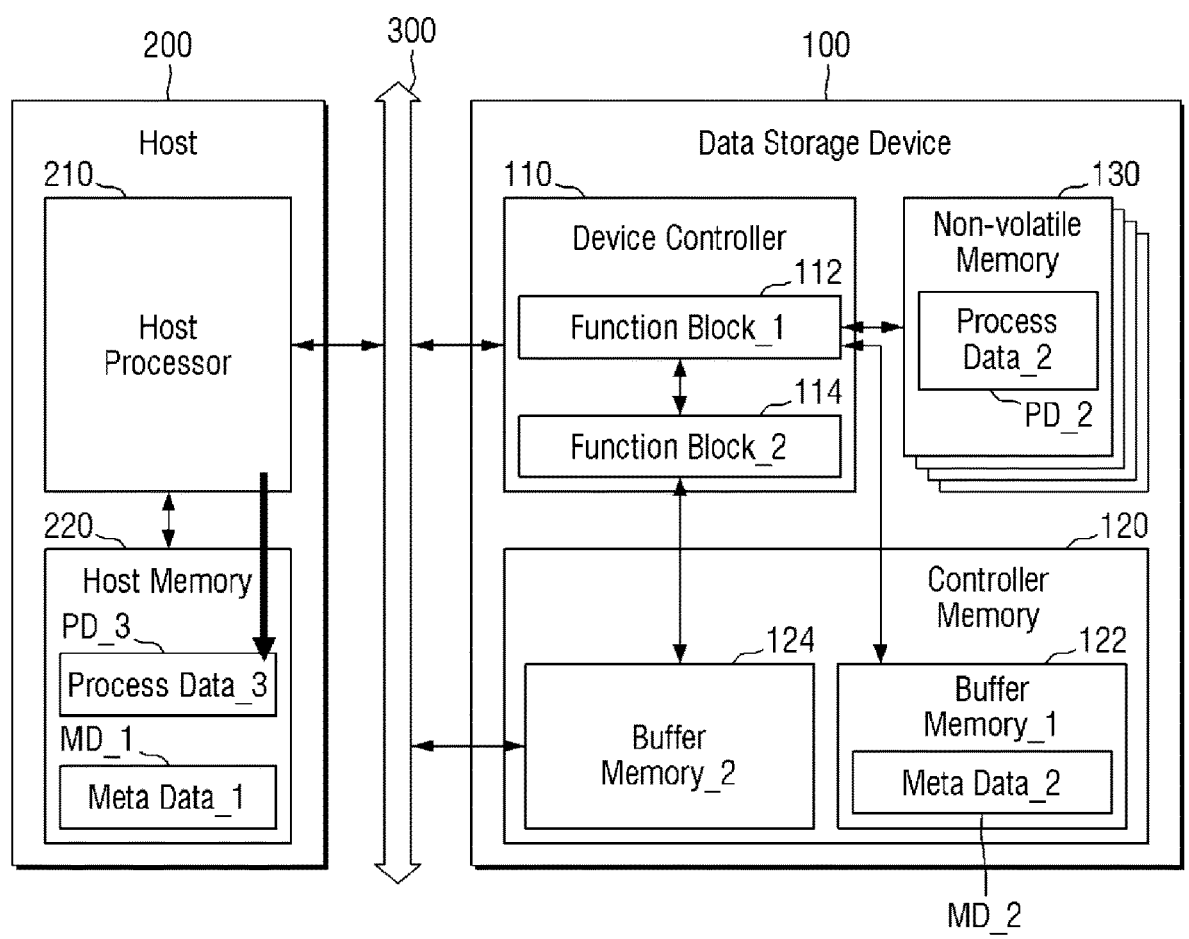

FIG. 12 is an exemplary flow chart illustrating a data read operation of a data storage system according to one or more example embodiments. FIGS. 13 and 14 are exemplary diagrams illustrating a data read operation of a data storage system according to one or more example embodiments. For convenience of explanation, repeated or similar contents will be omitted or briefly described.

Referring to FIGS. 1 and 12 to 14, the first function block 112 may receive the data read command related to the second process data PD_2 from the host processor 210 (S1210). The first function block 112 reads the second process data PD_2 stored in the non-volatile memory 130 via the first data path P1, and may provide the second process data PD_2 to the host 200 (S1220). In other words, the first function block 112 reads the second process data PD_2 with reference to the second metadata MD_2 stored in the first buffer memory 122, and may provide the read second process data PD_2 to the host processor 210. The host processor 210 may store the provided second process data PD_2 in the host memory 220. The host processor 210 may execute the third data processing on the second process data PD_2 with reference to the first metadata MD_1 stored in the host memory 220. In other words, the host processor 210 may generate third process data PD_3, using the second process data PD_2 (S1230).

For example, the second process data PD_2 may be data compressed at a compression ratio of x:1, and a maximum data read speed of the system bus 300 may be y (byte/s). According to one or more example embodiments, the third data processing, e.g., the decompression processing, may be performed by the host processor 210. At this time, in the second process data PD_2 provided to the host 200, because the data compressed to x:1 is read at the speed of y (byte/s), when the decompression processing is performed in the host processor 210, the maximum speed at which the host 200 reads data may be x*y (byte/s). In other words, the data storage system according to one or more example embodiments may read data at an improved speed further than the maximum data read speed physically provided by the system bus 300.

Figure 15:
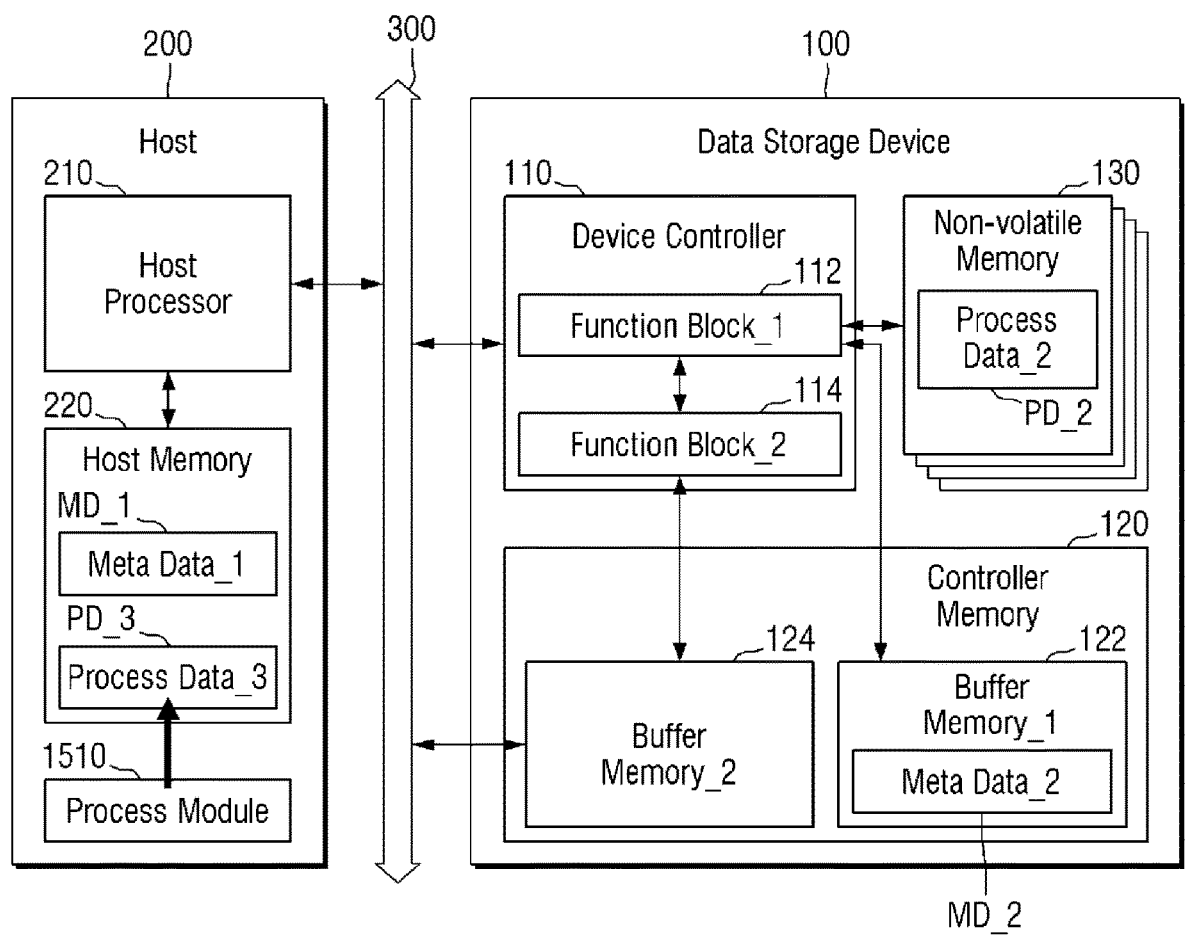
FIG. 15 is a diagram illustrating a data read operation of a data storage system according to one or more example embodiments.

FIG. 15 is an exemplary diagram illustrating a data read operation of the data storage system according to one or more example embodiments. For convenience of explanation, repeated or similar contents will be omitted or briefly described.

Referring to FIGS. 1, 12, 13 and 15, the host 200 may further include a process module 1510. For example, the process module 1510 may be implemented using hardware components. The process module 1510 may be a module that is distinct from the host processor 210. The process module 1510 may access the host memory 220. According to one or more example embodiments, the process module 1510 may perform third data processing on the data stored in the host memory 220. In other words, the process module 1510 that is distinct from the host processor 210 may generate the third process data PD_3, using the second process data PD_2. That is, the host processor 210 may receive the second process data PD_2 from the data storage device 100 and store it in the host memory 220. Subsequently, the process module 1510 may generate third process data PD_3 with reference to the first metadata MD_1 stored in the host memory 220.

According to one or more example embodiments, the third data processing may be performed by a module distinct from the host processor 210, i.e., a process module 1510. Accordingly, the overhead of the host processor 210 can be reduced.

While example embodiments have been shown and described above, it will be apparent to those skilled in the art that modifications and variations could be made without departing from the present disclosure.

What is claimed is:

1. A storage device comprising:
a controller including a first circuit and a second circuit, the first circuit being configured to receive a write command and a read command from an external device;
a first buffer memory coupled to the first circuit;
a second buffer memory coupled to the second circuit and configured to interface with the external device; and
a non-volatile memory coupled to the first circuit,
wherein the second circuit is configured to receive user data from the external device and to generate first data based on the user data,
the first circuit is configured to receive second data from the second circuit to write the second data to the non-volatile memory in response to the write command, the second data being generated by the external device based on the first data,
the first circuit is configured to read third data stored in the non-volatile memory in response to the read command, and to provide the third data to the second circuit,
the second circuit is configured to generate fourth data based on the third data, and to provide the fourth data to the first circuit, and
the first circuit is configured to provide the fourth data to the external device.

2. The storage device of claim 1, wherein the first circuit and the second circuit are configured to directly exchange data without using a bus.

3. The storage device of claim 1, wherein the second circuit receives the user data from the external device before the first circuit receives the write command from the external device.

4. The storage device of claim 1, wherein the first buffer memory is not accessible by the external device, and the second buffer memory is accessible by the external device.

5. The storage device of claim 1, wherein when the controller performs a garbage collection operation on the non-volatile memory, the first circuit reads data stored in the non-volatile memory and stores the data in the first buffer memory.

6. A storage device comprising:
a controller including a first circuit and a second circuit;
a buffer memory coupled to the first circuit and the second circuit; and
a non-volatile memory coupled to the first circuit,
wherein the first circuit and the second circuit are configured to directly exchange data,
the first circuit is configured to receive first data from the second circuit and to write the first data to the non-volatile memory,
the second circuit is configured to receive user data from an external device and to generate second data based on the user data, and
the first data is generated by the external device based on the second data.

7. The storage device of claim 6, wherein the buffer memory includes:
a first buffer memory coupled to the first circuit; and
a second buffer memory coupled to the second circuit and configured to interface with the external device.

8. The storage device of claim 6, wherein the buffer memory is a single buffer memory and includes:
a first portion coupled to the first circuit; and
a second portion coupled to the second circuit.

9. The storage device of claim 6, wherein the buffer memory is included in the controller.

10. The storage device of claim 6, wherein the first circuit is configured to receive a write command from the external device, and to write the first data to the non-volatile memory in response to the write command.

11. The storage device of claim 10, wherein the second circuit receives the user data from the external device before the first circuit receives the write command from the external device.

12. The storage device of claim 6, wherein the second circuit stores the second data in the buffer memory.

13. The storage device of claim 6, wherein the first circuit controls the non-volatile memory.

14. A storage device comprising:
a controller including a first circuit and a second circuit;
a buffer memory coupled to the first circuit and the second circuit; and
a non-volatile memory coupled to the first circuit,
wherein the first circuit and the second circuit are directly interconnected to each other without a bus,
the first circuit is configured to receive a read command from an external device, to read first data generated by the external device and stored in the non-volatile memory in response to the read command, and to provide the first data to the second circuit,
the second circuit is configured to generate second data based on the first data, and to provide the second data to the first circuit, and
the first circuit is configured to provide the second data to the external device.

15. The storage device of claim 14, wherein the buffer memory includes:
a first buffer memory coupled to the first circuit; and
a second buffer memory coupled to the second circuit and configured to interface with the external device.

16. The storage device of claim 15, wherein the second circuit stores the second data in the second buffer memory.

17. The storage device of claim 15, wherein the first buffer memory is not accessible by the external device, and the second buffer memory is accessible by the external device.

18. The storage device of claim 14, wherein the second circuit performs a data processing on the first data to generate the second data.

19. The storage device of claim 14, wherein the controller includes the buffer memory that includes a first portion coupled to the first circuit and a second portion coupled to the second circuit.

20. The storage device of claim 14, wherein when the controller performs a garbage collection operation on the non-volatile memory, the first circuit reads data stored in the non-volatile memory and stores the data in the buffer memory.

* * * * *